United States Patent

Naruse et al.

Patent Number: 5,409,656
Date of Patent: Apr. 25, 1995

[54] METHOD AND APPARATUS FOR ADJUSTING THE CENTER OF GRAVITY OF THE ARTICLE BY POSITIONING ECCENTRIC RINGS OF THE MOLD

[75] Inventors: Takahiro Naruse, Toyoake; Kazuo Nishizawa, Chiryu; Akio Ueda, Nagoya; Akio Shimizu, Hekinan; Hiroshi Uchida, Kariya, all of Japan

[73] Assignee: Nippondenso Co., Ltd., Kariya, Japan

[21] Appl. No.: 269,898

[22] Filed: Jul. 6, 1994

Related U.S. Application Data

[63] Continuation of Ser. No. 943,719, Sep. 11, 1992, abandoned.

[30] Foreign Application Priority Data

Sep. 13, 1991 [JP] Japan ................................ 3-234764

[51] Int. Cl.[6] ....................... B29C 45/14; B29C 33/76
[52] U.S. Cl. .................................. 264/275; 264/328.1; 249/137; 425/192 R; 425/577; 425/468
[58] Field of Search ................. 264/328.1, 271.1, 275, 264/278; 249/102, 103, 137, 154, 155, 158, 159; 425/190, 192 R, 577, 468

[56] References Cited

U.S. PATENT DOCUMENTS

| 4,047,692 | 9/1977 | Swin, Sr. . |
| 4,107,257 | 8/1978 | Swin, Sr. . |
| 5,034,170 | 7/1991 | Briggs, Jr. et al. ................. 425/577 |

FOREIGN PATENT DOCUMENTS

| 48-62607 | 8/1973 | Japan . |
| 49-11066 | 1/1974 | Japan . |
| 50-61403 | 6/1975 | Japan . |
| 50-102971 | 8/1975 | Japan . |

*Primary Examiner*—Jill L. Heitbrink
*Attorney, Agent, or Firm*—Cushman, Darby & Cushman

[57] ABSTRACT

A molding die having, an outer eccentric ring slidably fitted in an axle hole of a boss molding die assembly of a molding die unit, outer eccentric ring being formed with an eccentric hole the center of which is deviated from the center of the outer eccentric ring, an inner eccentric ring slidably fitted in this eccentric hole of the outer eccentric ring, and a holding pin for holding an insert and slidably fitted in the inner eccentric ring at a point which is deviated from the center of the inner eccentric ring. In adjusting the balance, the position of the holding pin is adjusted such that the center of rotation coincides with the center of gravity of the molded articles. In forming the die, the insert held by the holding pin of which position was adjusted is embedded in the molded article.

7 Claims, 5 Drawing Sheets

METHOD AND APPARATUS FOR ADJUSTING THE CENTER OF GRAVITY OF THE ARTICLE BY POSITIONING ECCENTRIC RINGS OF THE MOLD

This is a continuation of application Ser. No. 07/943,719, filed on Sep. 11, 1992, which was abandoned upon the filing hereof.

BACKGROUND OF THE INVENTION

The present invention relates to a molding die and, more particularly, to a molding die used for manufacturing a cooling fan to be used in an automobile radiator, a condenser and the like.

In general, the molded article such as a fan is manufactured in such a manner that the center of gravity thereof coincides with the center of rotation thereof. If the center of gravity does not coincide with the center of rotation, such the molded article must be subjected to balance adjustment.

As means for adjusting the balance of such molded article it has been known to form a by adjusting a rugged portion in a molding die as disclosed in Japanese Utility Model Unexamined Publication Nos. 49-11066 and 50-102971 or to form a balance-adjusting projection on the molded article as disclosed in Japanese Utility Model Unexamined Publication Nos. 48-62607 and 50-61403.

According to such method of adjusting the balance of the molded article, when the center of gravity is unbalanced, a weight corresponding to the shortage is added to the light-weight side of the molded article so as to make the center of gravity coincide with the center of rotation, thereby eliminating the imbalance.

The quantity of unbalance of the molded article on a plane perpendicularly intersecting the axis thereof is generally expressed by two components including "direction" and "magnitude". The "direction" component can basically be expressed by a vector, with an unspecified magnitude, extending in a direction from the center of rotation towards the center of gravity of the fan. The "magnitude" can be expressed as a vector being a product of the weight of the fan and the distance between the center of gravity and center of rotation.

SUMMARY OF THE INVENTION

Based on such information, the present inventors have discovered a method according to which the uneven balance, if existing in the molded article, can be eliminated by moving the center of rotation of the molded article in such a manner that it coincides with the center of gravity thereof.

Namely, in a molding die of the present invention, taking note of the principles of balance correction as described above, a mechanism for adjusting the center of rotation is added to the die itself, which mechanism is capable of moving the position of a holding pin which serves to hold an insert to be attached to a molded article at the center of gravity thereof.

An object of the present invention is to provide a molding die which makes it possible to accurately adjust the balance in a shorter time by simple operation wherein the die itself is provided with a means for changing the center of rotation of the molded article.

A further purpose of the present invention is to provide a molding die which is used particularly to form a fan that is provided with an insert for shaft connection at the center of rotation thereof.

Still a further purpose of the present invention is to provide a method for forming a molded article by making use of a die which is provided with a means for changing the center of rotation of the article so as to make it possible to ensure rotational balance satisfactorily.

According to the present invention, there is provided a molding die used to form a molded article having an insert embedded at the center of rotation thereof, which molding die comprises a die body formed with a first circular hole and used to form the molded article, an outer eccentric ring slidably fitted in a first inner peripheral wall serving to form the first circular hole and formed with a second circular hole the center of which is deviated from the center of the first circular hole, an inner eccentric ring slidably fitted in a second peripheral wall serving to form the second circular hole and having a reference point or centering portion which can be adjusted according to the center of gravity of the molded article and the center of which is deviated from the center of the second circular hole, and a holding pin fixed at the reference point of the inner eccentric ring and serving to hold the insert during the molding process.

Balance adjustment is effected in the following manner. First, a molded article is formed by using the molding die of the present invention, and the amount of imbalance of the molded article is measured and expressed by the "direction" of the center of gravity with respect to the center of rotation and the "magnitude". The holding pin is used to position the insert to be attached to the molded article and is moved in the direction opposite to the "direction" by the same "magnitude" so as to make up the quantity of imbalance, that is, to make the center of rotation coincide with the center of gravity, thereby correcting the position of the holding pin. By employing the molding die in which the position of the holding pin is corrected in this way, it is possible to form a well balanced molded article.

DESCRIPTION OF THE PREFERRED EMBODIMENT

Description will be given below of a preferred embodiment of the present invention with reference to the drawings.

Figure 2:
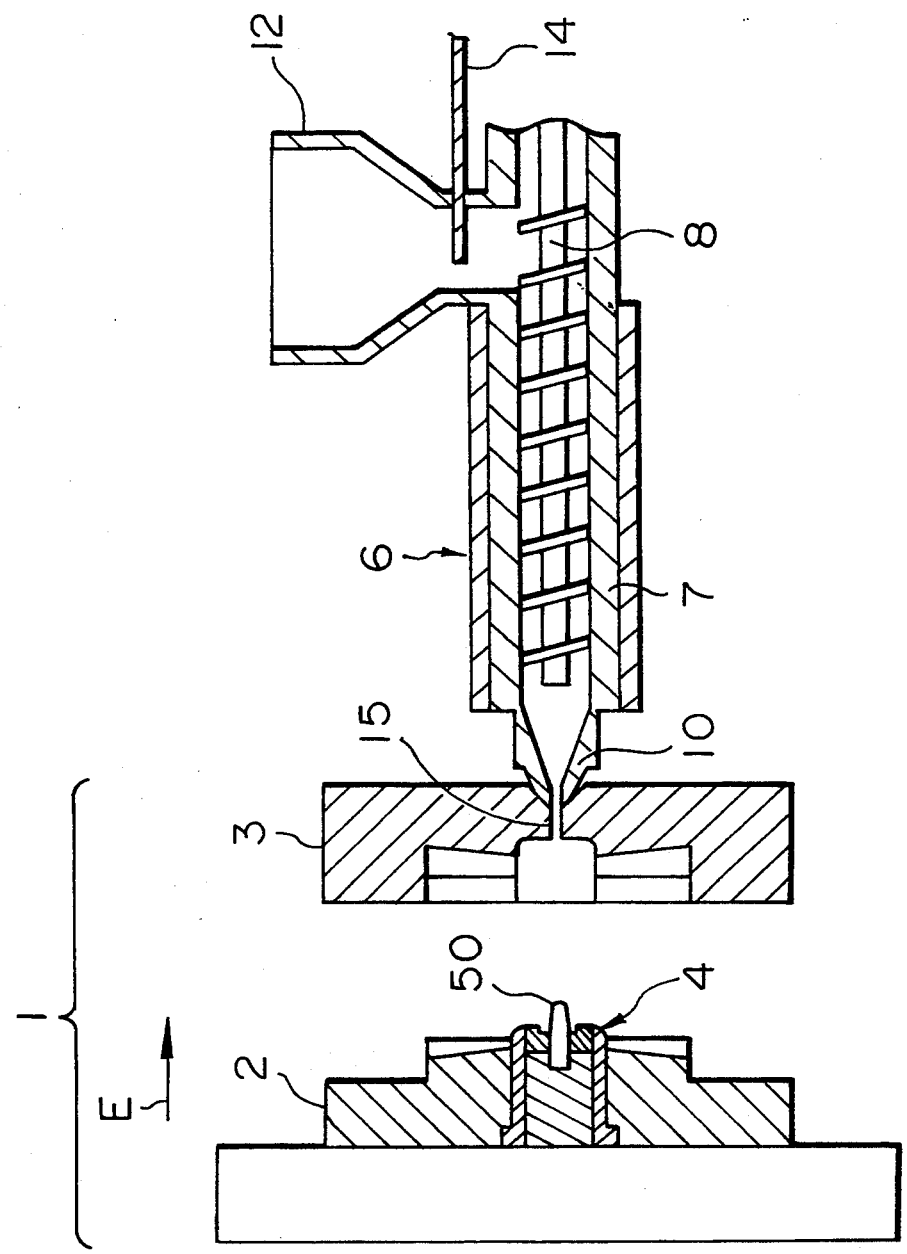
FIG. 2 is a schematic view of an injection molding machine according to the present invention.

First, FIG. 2 illustrates an injection molding apparatus which serves to form a fan by employing a molding die of the present invention.

Referring to FIG. 2, a fan molding die unit 1 comprises a movable die 2, a fixed die 3 and a boss molding die assembly 4. An injection molding machine 6 comprises a cylinder 7, a screw 8, a nozzle 10, a hopper 12, a metering plunger 14 and other means. Resin material to be charged from the hopper 12 into the cylinder 7 is measured in quantity by the metering plunger 14 and, due to the prescribed amount of rotation of the screw 8, injected from the nozzle 10 into the cavity of the fan molding die unit 1 through an inlet 15.

Figure 9:
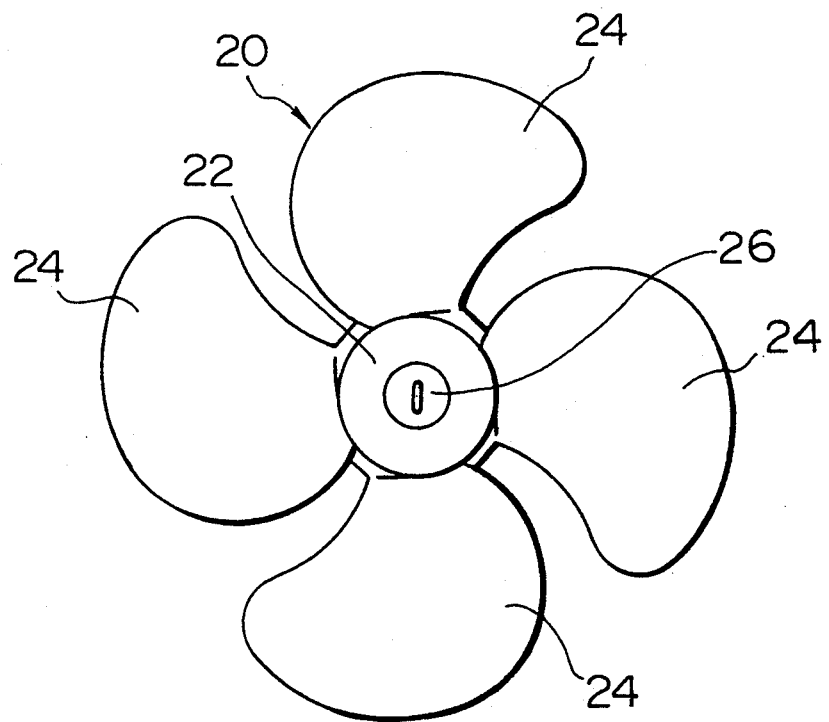
FIG. 9 is a plan view of the molded fan formed by molding of the present invention.

As a result of the injection molding using the fan molding die unit 1, there is obtained a fan 20 having for example a configuration shown in FIG. 9. In this case, the fan 20 comprises four blades 24, a boss 22 on which the blades 24 are mounted, and a metallic insert 26 to be attached to the boss 22.

Figure 1:
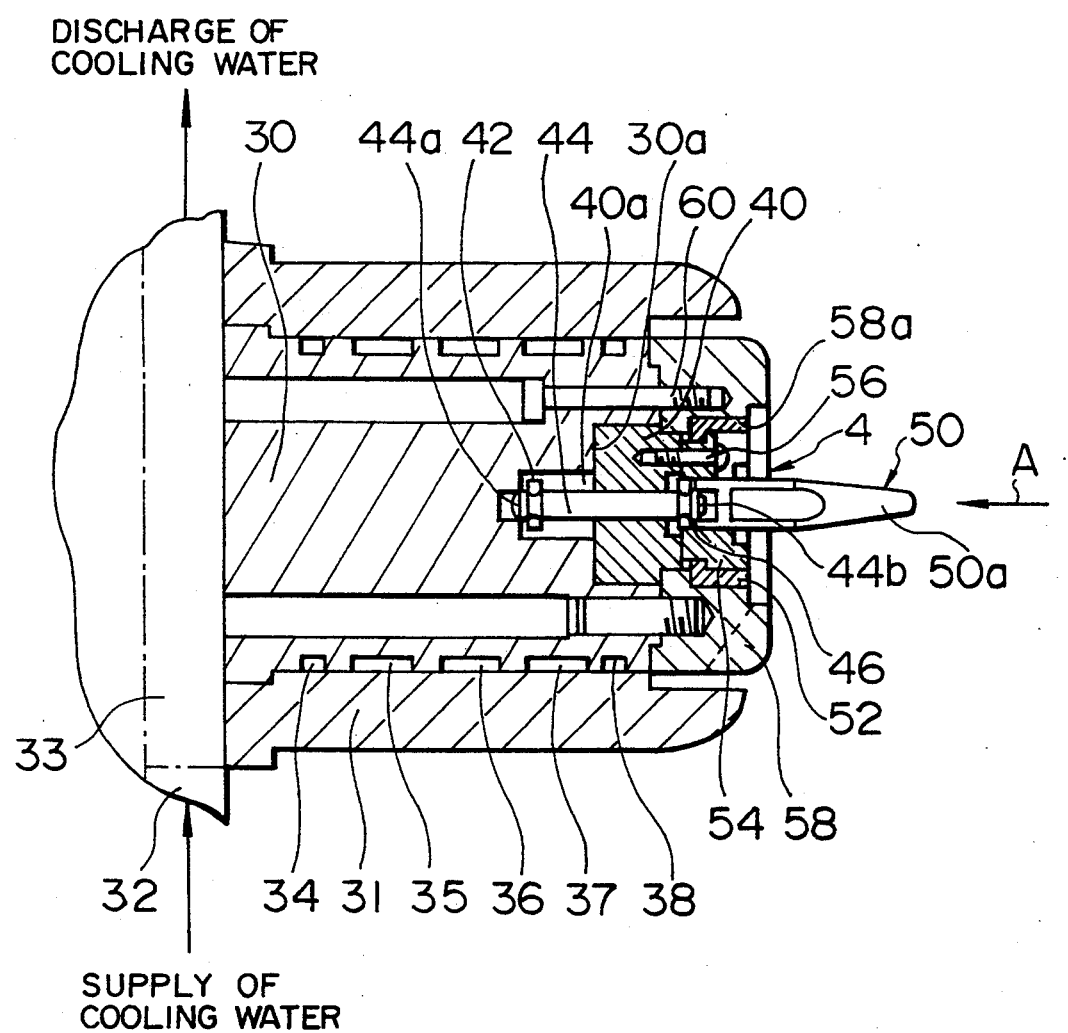
FIG. 1 is a partially sectional side view of an essential part of a boss molding die assembly according to an embodiment of the present invention.
Figure 3:
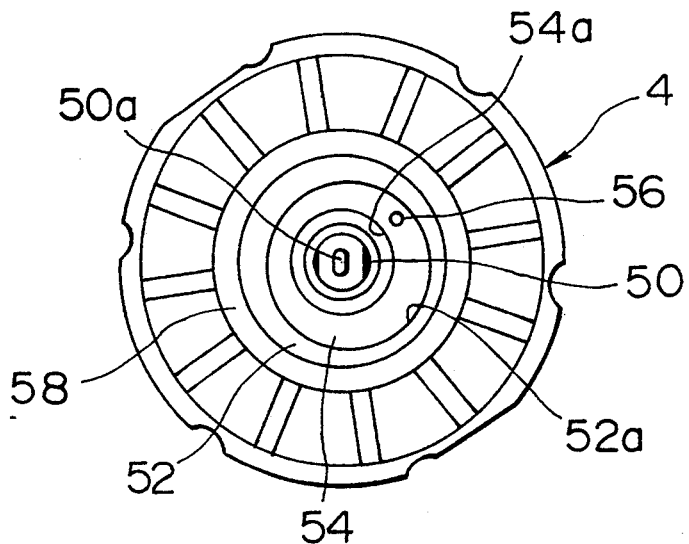
FIG. 3 is an end view as viewed in a direction indicated by an arrow A in FIG. 1.

Next, the boss molding die assembly 4 which is to be attached to the movable die 2 as shown in FIG. 2 will be described by referring to FIGS. 1 and 3. As shown in FIG. 1, a second insertion die 31 of a cylindrical form is fitted on a first insertion die 30 of a columnar form, and these first and second insertion dies 30 and 31 are fixed to a bracket 32 by means of a block 33. The first insertion die 30 is formed in the outer periphery thereof with annular grooves 34, 35, 36, 37 and 38 which serve as cooling water passages. The cooling water is led to the annular grooves 34, 35, 36, 37 and 38 through the cooling water passage which is formed in the block 33 but not shown and, after absorbing heat from the first and second insertion dies 30 and 31, discharged to the outside through the cooling water outlet formed in the block 33 although not shown. A disc like base plate 40 is disposed in a concaved portion 30a which is formed in the end portion of the first insertion die 30. A shaft 44 is fixed at one end 44a thereof in another concaved portion 40a of the first insertion die 30. To the other end 44b of the shaft 44 is fixed a holding pin 50 by means of a pin 46. Tip end portion 50a of the holding pin 50 has an elliptic cross-section and is tapered as going to its tip end. An outer eccentric ring 52 and an inner eccentric ring 54 are fitted on the holding pin 50 and adjustablly joined to the base plate 40 with an adjusting bolt 56. A holder 58 serving to hold the outer eccentric ring 52 is fixed by a fixing bolt 60. Simultaneously with this fixing, the base plate 40 is fixed to the first insertion die 30.

Figure 7A:
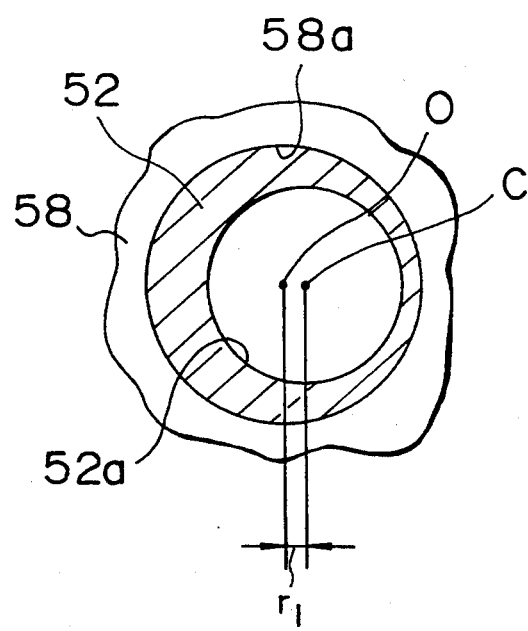
FIG. 7A is a partially sectional schematic view of the outer eccentric ring of the present invention.

Before fastening the adjusting bolt 56, the outer eccentric ring 52 is fitted in an axle hole 58a of the holder 58 so as to be slidable along the inner peripheral wall thereof in the circumferential direction. As shown in FIG. 7A, the outer eccentric ring 52 is formed with an eccentric hole 52a the center of which is deviated from the center of the outer eccentric ring 52. The eccentricity of the eccentric hole 52a is $r_1$.

Figure 7B:
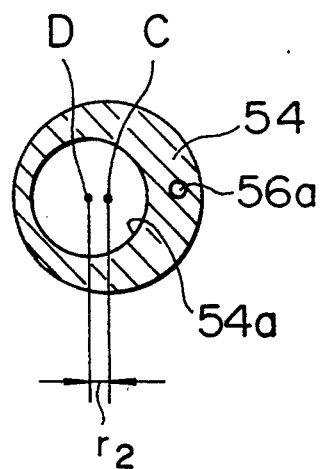
FIG. 7B is a sectional schematic view of the inner eccentric ring of the present invention.

The inner eccentric ring 54 is fitted in the eccentric hole 52a so as to be slidable along the inner peripheral wall thereof in the circumferential direction. As shown in FIG. 7B, the inner eccentric ring 54 is formed with an eccentric hole 54a which functions as a centering portion of eccentric ring 54 and is used to position holding pin 50. The center of eccentric hole is deviated from the center of the inner eccentric ring 54. The holding pin 50 is slidably fitted in the eccentric hole 54a. The eccentricity of the eccentric hole 54a is $r_2$.

Figure 6:
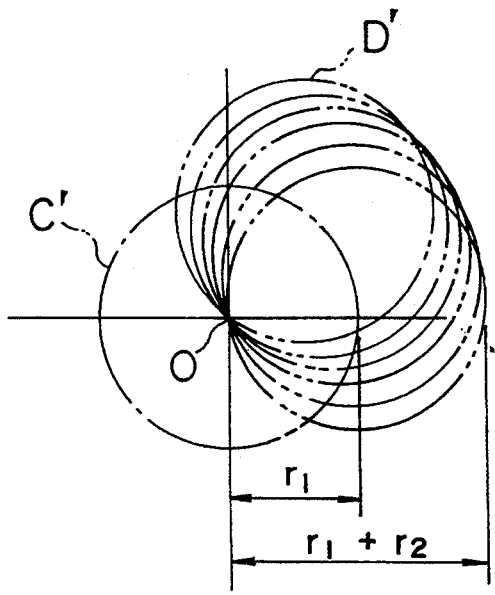
FIG. 6 is an explanatory view showing the loci of the center of the eccentric hole of an outer eccentric ring and the center of the eccentric hole of the inner eccentric ring according to the present invention.

In this case, the locus of the center C of the eccentric hole 52a of the outer eccentric ring 52 with respect to the center O of the axle hole 58a of the holder 58 is a circle as indicated by a one-dot chain line C' in FIG. 6, while the locus of the center D of the eccentric hole 54a of the inner eccentric ring 54 with respect to the center C of the eccentric hole 52a is any of the circles indicated by two-dot chain lines D' in FIG. 6. Accordingly, assuming that the center D of the eccentric hole 54a of the inner eccentric ring 54 is located at the distance of radius r from the center O of the axle hole 58a of the holder 58, the radius r satisfies the following equations.

$$O \geq r \geq r_{max}$$

$$r_{max} = r_1 + r_2$$

Therefore, the position of the center of the holding pin 50 is allowed to be moved to any arbitrary position within the range of a circle with its center at the center O of the axle hole 58a of the holder 58 and with a maximum radius $r_{max}$ ($=r_1+r_2$). This makes it possible to adjust the position of the center of the holding pin 50 with respect to the position of the axis of the holder 58 within the limits of the distance of the maximum radius $r_{max}$.

Next, description will be given of the procedure for the balance adjustment of a molded article formed by utilizing the boss molding die assembly 4.

Figure 4:
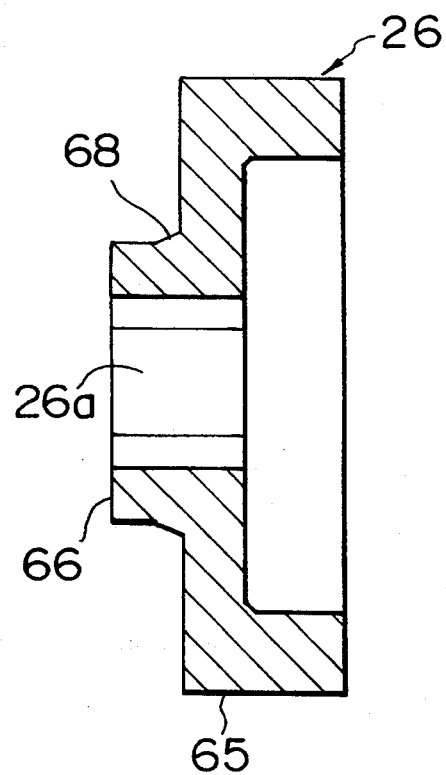
FIG. 4 is an enlarged sectional view of an insert to be embedded in a molded article formed by the die according to the present invention.

First, the boss molding die assembly 4 is attached to the movable die 2 of the fan molding die unit 1 shown in FIG. 2. The boss molding die assembly 4 employed in this case comprises the outer eccentric ring 52 with the eccentricity $r_1$ ($=r$) of 0.1 mm and the inner eccentric ring 54 with the eccentricity $r_2$ ($=r$) of 0.1 mm. An elongated hole 26a of an insert 26 shown in FIG. 4 is fitted on the holding pin 50 of the boss molding die assembly 4 and the movable die 2 is then moved to the fixed die 3 in the direction of an arrow mark E shown in FIG. 2 until the movable die 2 is coupled to the fixed die 3. Subsequently, the screw 8 is rotated so that the resin material in the cylinder 7 is injected from the nozzle 10 into the cavity of the die through the inlet 15 so as to be subjected to the molding. Thereafter, the movable die 2 is moved away from the fixed die 3 in the direction opposite to the direction of the arrow mark E so as to take the molded article thus formed out of the cavity of the die. The molded article thus taken out is for example a fan 20 shown in FIG. 9.

Figure 8:
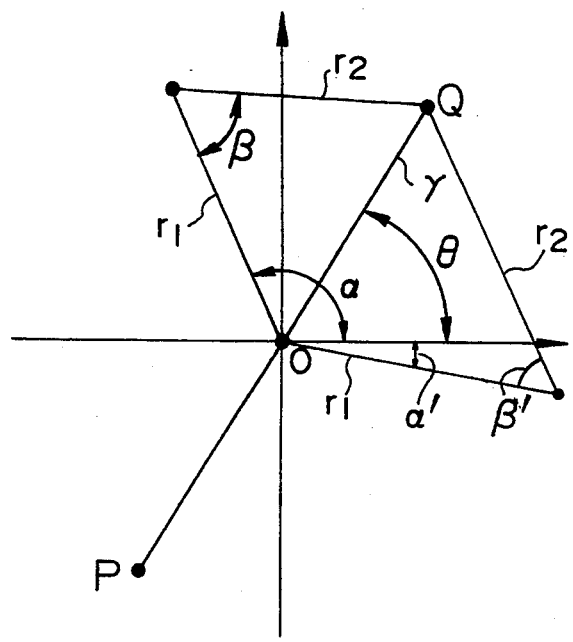
FIG. 8 is an explanatory view showing the procedure for the balance adjustment according to the present invention.

The fan 20 is then measured in terms of the quantity of unbalance with a balance measuring device which is not shown. Specifically, the unbalance the insert 26 of the fan 20 is as compared with the center of gravity of the fan. the directional value and the weight value of imbalance of fan 20 is obtained by the balance measuring device. This will be described in detail by referring to FIG. 8. In FIG. 8, the origin O of the coordinate axes represents the present position of the insert 26 held by the holding pin 50. In FIG. 8, assuming that a point P represents the balance value measured by the balance measuring device as the eccentricity, the insert 26 has to be moved for eliminating imbalance to the position of a point Q which is symmetric with respect to the point P about the origin O. Namely, it is necessary to move the position of the center of the inner eccentric ring 54 to the position of the point Q.

Here, assuming that the angles through which the outer and inner eccentric rings 52 and 54 must be rotated are $\alpha$ and $\beta$, respectively, the angles $\alpha$ and $\beta$ can be computed in accordance with the following expression 1.

$$\alpha = \theta + \cos^{-1}\frac{\gamma}{2\delta}$$

$$\beta = 180 - 2\cos^{-1}\frac{\gamma}{2\delta}$$

or $$\alpha' = \theta - \cos^{-1}\frac{\gamma}{2\delta}$$

$$\beta' = 180 + 2\cos^{-1}\frac{\gamma}{2\delta}$$

Expression 1 where
- $\alpha, \alpha'$: angle of rotation of outer eccentric ring
- $\beta, \beta'$: angle of rotation of inner eccentric ring (relative to angle $\alpha$)
- $\gamma$: required amount of movement of insert
- $\theta$: required angle of rotation of insert
- $\delta$: eccentricity of each eccentric ring Next, the outer and inner eccentric rings 52 and 54 are simultaneously rotated through the angle $\alpha$ or $\alpha'$ based on the outer eccentric ring rotation angle $\alpha$ or $\alpha'$ and the inner eccentric ring rotation angle $\beta$ or $\beta'$. Then, the outer eccentric ring 52 is fixed and only the inner eccentric ring 54 is rotated through the angle $\beta$ or $\beta'$. The adjusting bolt 56 is inserted into a hole 56a formed in the inner eccentric ring 54 and fastened to the holder 58 in a position of the outer eccentric ring 52 thus rotated at which the inner eccentric ring 54 is brought to a stop, so that the outer and inner eccentric rings 52 and 54 are fixed with respect to the holder 58. In this way, the balance adjustment is completed.

In the above, it is to be noted that when the rotation of the inner and the outer eccentric rings are commenced, the center C of the outer ring 52 is on the extremely right on the abscissa of FIG. 8 and the center D of the inner ring 54 is on the extremely left on the abscissa thereof. In the above example, the eccentricities $r_1$ and $r_2$ are the same, and thus the center C of the inner ring coincides with the center D of the outer ring.

The injection molding method in which the molded fan is manufactured by employing the balance-adjusted boss molding die assembly 4 is similar to the aforesaid injection molding method, and therefore, description of this injection molding method will be omitted.

Figure 5:
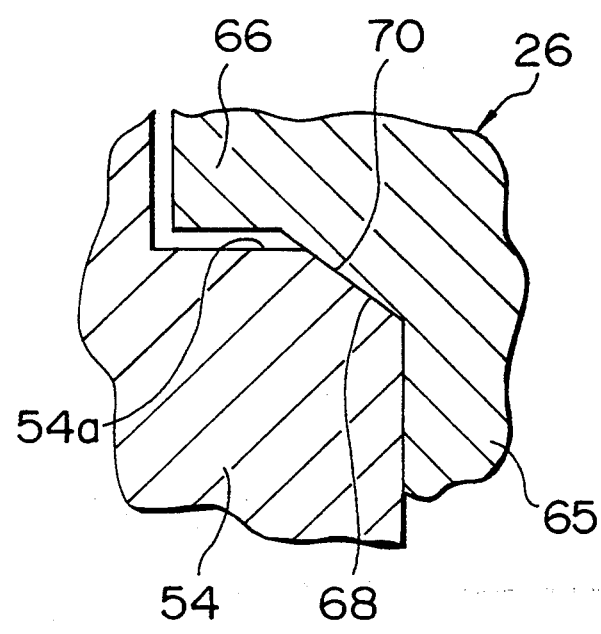
FIG. 5 is a fragmentary enlarged sectional view showing the positional relation between an inner eccentric ring and the insert in the molding process.

Next, FIGS. 4 and 5 show the details of an example of the means for fixing the inner eccentric ring and the insert of the boss molding die assembly of the aforesaid embodiment.

As shown in FIG. 4, a cylindrical projection 66 which is formed on a base plate 65 of the insert 26 is formed at the root portion thereof with an annular inclined plane 68. On the other hand, the inner eccentric ring 54 is also formed with an annular inclined plane 70 in the end surface thereof which is allowed to come in contact with the inclined plane 68. The angles of inclination of the inclined planes 68 and 70 are substantially equal to each other. Since these inclined planes 68 and 70 are made to press on each other, the accuracy with which the insert 26 is positioned with respect to the inner eccentric ring 54 can be improved. Accordingly, a positional offset error of the insert 26 with respect to the inner eccentric ring 54 can be eliminated during the injection molding process so that the positioning accuracy of the insert 26 can be improved. As a consequence, the insert 26 can be exactly embedded in such a manner so that the center of gravity of the molded apparatus coincides with the center of rotation thereof.

In the embodiment described above, description has been made as to the case in which the eccentricity $r_1$ is equal to the eccentricity $r_2$ ($r_1=r_2$), and however, the present invention is applicable to the case in which $r_1 \neq r_2$ as well. Further, the above-described embodiment has been made as to the case in which the injection molding die is employed, and however, it goes without saying that the die of the present invention can be employed in the press molding, the extrusion molding and other molding process besides the injection molding.

As has been described above, according to the molding die of the present invention, since the mechanism for adjusting the position of the embedded insert is provided in the die itself, even when there is caused unbalance in the molded article formed by the die, the unbalance can be easily eliminated by adjusting the position of the holding pin of the die in accordance with the measured value of the balance. In addition, according to the molding method of the present invention, since the molded article is formed by making use of the molding die which is capable of adjusting the center of rotation satisfactorily, it is possible to effectively ensure the rotational balance of the molded article.

We claim:

1. A method for molded article having an insert disposed at a center of gravity rotatably balancing a multi-blade fan by securing an insert for attachment with a rotary shaft to a boss and blade assembly substantially at the center of gravity thereof, said method comprising the steps of:
    determining a direction and magnitude of gravitational imbalance of said boss and blade assembly as said boss and blade assembly is rotated in order to ascertain a relative position on said boss and blade assembly which corresponds to the center of gravity thereof;
    rotating inner and outer eccentric rings of a molding die with respect to one another as a function of the determined direction and magnitude of gravitational imbalance an so that a holding pin fixed at a centering portion of said inner eccentric ring is generally positioned according to the center of gravity of said boss and blade assembly;
    fixing the rotational positions of said inner and outer eccentric rings; and
    using said holding pin to position said insert according to said center of gravity of said boss and blade assembly during a molding operation in which said insert is attached to said boss and blade assembly at said center of gravity thereof.

2. A method for rotatably balancing a multi-blade fan comprising the steps of:
    determining a direction and magnitude of gravitational imbalance of said boss and blade assembly in order to ascertain a relative position on said boss and blade assembly which corresponds to the center of gravity thereof;

rotating inner and outer eccentric rings of a molding die with respect to one another as a function of the determined direction and magnitude of gravitational imbalance and so that a holding pin fixed at a centering portion of said inner eccentric ring is generally positioned according to the center of gravity of said boss and blade assembly;

fixing the rotational positions of said inner and outer eccentric rings;

using said holding pin to position said insert according to the determined center of gravity of said boss and blade assembly; and securing said insert to said boss and blade assembly at the center of gravity thereof during a molding operation.

3. A molding die used to form a rotatably balanced fan having a boss, blades extending radially outwardly from said boss, and an insert located substantially at the center of gravity of said fan and adapted to connect the boss to a rotary shaft, said molding die comprising:

a fixed die member having an inlet adapted to deliver a resin material into said molding die;

a movable die member constructed and arranged to be moved with respect to said fixed die member;

a boss forming die member disposed generally at the center of said movable die member for forming the boss and having a first circular hole formed therein;

said fixed die, movable die and boss forming die members being cooperable to form a mold cavity having a shape of said fan;

an outer eccentric ring disposed in said first circular hole and having a second circular hole formed therein, the center of said second circular hole being spaced apart from the center of said first circular hole;

an inner eccentric ring disposed in said second circular hole, said inner and outer eccentric rings being positionable so that a centering portion of said inner eccentric ring is positioned according to said center of gravity of said fan, said centering portion having a center thereof spaced apart from the center of said second circular hole;

means for fixing the positions of said inner and outer eccentric rings relative to one another so as to fix said centering portion of said inner eccentric ring at said center of gravity of said fan; and a holding pin fixed at said centering portion of said inner eccentric ring and adapted to hold said insert thereat during a molding process in which said insert is fixed at the center of gravity of said fan.

4. A molding die according to claim 3, wherein said centering portion comprises a third circular hole disposed in said inner eccentric rings and wherein said outer and the inner rings are slidably rotatable with respect to one another to position said third circular hole at said center of rotation of said fan.

5. A molding die according to claim 4, further comprising means for adjustably connecting said outer eccentric ring and the inner eccentric ring to said boss forming die member.

6. A molding die according to claim 5, wherein said means for connecting said outer and inner eccentric rings to the boss forming die member is an adjustable bolt.

7. A molding die according to claim 3, wherein the eccentricities of said outer and the inner rings are the same as one another.

* * * * *